US007871701B2

(12) United States Patent
Mullen et al.

(10) Patent No.: US 7,871,701 B2
(45) Date of Patent: Jan. 18, 2011

(54) CHIPBOARD

(75) Inventors: Robert L. Mullen, Columbia, SC (US); Antonius Kurniawan, Huntsville, AL (US)

(73) Assignee: Engineering Research Associates, Inc, Huntsville, AL (US)

( * ) Notice: Subject to any disclaimer, the term of this patent is extended or adjusted under 35 U.S.C. 154(b) by 0 days.

(21) Appl. No.: 12/860,878

(22) Filed: Aug. 21, 2010

(65) Prior Publication Data

US 2010/0316839 A1 Dec. 16, 2010

Related U.S. Application Data

(62) Division of application No. 12/102,050, filed on Apr. 14, 2008.

(51) Int. Cl.
*B32B 5/16* (2006.01)

(52) U.S. Cl. .................................... 428/401; 428/537.1

(58) Field of Classification Search ................. 428/375, 428/401, 537.1, 292.4
See application file for complete search history.

(56) References Cited

U.S. PATENT DOCUMENTS

| | | | |
|---|---|---|---|
| 2,986,782 | A | 12/1956 | Elmendorf |
| 3,164,511 | A | 1/1965 | Elmendorf |
| 3,202,743 | A | 8/1965 | Elmendorf |
| 3,563,844 | A | 2/1971 | Brown |
| 3,670,791 | A | 6/1972 | Johnson |
| 3,793,125 | A | 2/1974 | Kunz |
| 4,035,120 | A | 7/1977 | Eriksson |
| 4,058,201 | A | 11/1977 | Etzold |
| 4,096,796 | A | 6/1978 | Saunders et al. |
| 4,112,162 | A | 9/1978 | Casselbrant |
| 4,241,133 | A | 12/1980 | Lund et al. |
| 4,246,310 | A | 1/1981 | Hunt et al. |
| 4,339,478 | A | 7/1982 | Greten et al. |
| 4,610,913 | A | 9/1986 | Barnes |
| 4,751,131 | A | 6/1988 | Barnes |
| 5,002,713 | A | 3/1991 | Palardy et al. |
| 5,017,319 | A | 5/1991 | Shen |
| RE34,283 | E | 6/1993 | Barnes |
| 5,274,899 | A | 1/1994 | Sentagnes et al. |
| 5,425,976 | A | 6/1995 | Clarke et al. |
| 5,435,054 | A | 7/1995 | Tonder et al. |
| 5,470,631 | A | 11/1995 | Lindquist et al. |
| 5,506,026 | A | 4/1996 | Iwata et al. |
| 5,539,027 | A | 7/1996 | Deaner et al. |

(Continued)

*Primary Examiner*—Alexander Thomas
(74) *Attorney, Agent, or Firm*—Pearne & Gordon LLP

(57) ABSTRACT

An oriented strand board for structural applications and a method of its production comprising elongated strands having aspect ratios greater than 2, the strands being derived from the outer shells of oil palm tree fronds formed as a bi-product of the harvest of oil palm fruit, such that the strand length is limited to about a meter, the strands being cut from the outer shell area of the fronds and at least the outer regions of the major faces of the board being substantially free of core material, the shell strands being combined with a heat settable binder material, the strands being formed by elongated blades moving relative to a frond length in planes generally aligned with a longitudinal direction of the frond length, the strands of the frond shells being arranged and being permanently bonded together such that they are predominately generally aligned with the structural direction of the board at least at the outer regions of the major faces of the board.

4 Claims, 4 Drawing Sheets

U.S. PATENT DOCUMENTS

| | | | |
|---|---|---|---|
| 5,554,429 | A | 9/1996 | Iwata et al. |
| 5,585,155 | A | 12/1996 | Heikkila et al. |
| 5,736,218 | A | 4/1998 | Iwata et al. |
| 5,988,537 | A | 11/1999 | Marra |
| 6,136,408 | A | 10/2000 | Radcliffe et al. |
| 6,383,652 | B1 | 5/2002 | Templeton et al. |
| 6,390,161 | B1 | 5/2002 | Freitag et al. |
| 6,451,153 | B1 | 9/2002 | Symons |
| 6,461,472 | B2 | 10/2002 | Fujii |
| 6,461,743 | B1 | 10/2002 | Tanzer et al. |
| 6,479,127 | B1 | 11/2002 | Kornicer et al. |
| 6,562,479 | B1 | 5/2003 | Smalley et al. |
| 6,589,660 | B1 | 7/2003 | Templeton et al. |
| 6,605,245 | B1 | 8/2003 | Dubelsten et al. |
| 6,620,459 | B2 | 9/2003 | Colvin et al. |
| 6,641,909 | B1 | 11/2003 | Wasylciw |
| 6,756,105 | B1 | 6/2004 | Haataja |
| 6,761,798 | B2 | 7/2004 | Altheimer et al. |
| 6,767,490 | B2 | 7/2004 | Sean et al. |
| 6,800,352 | B1 | 10/2004 | Hejna et al. |
| 6,818,317 | B2 | 11/2004 | Hejna et al. |
| 6,830,784 | B2 | 12/2004 | Gutowski et al. |
| 6,830,797 | B2 | 12/2004 | Haataja |
| 6,846,553 | B2 | 1/2005 | Haataja et al. |
| 6,916,523 | B2 | 7/2005 | Haataja |
| 6,926,785 | B2 | 8/2005 | Tanzer et al. |
| 2003/0026942 | A1 | 2/2003 | Hejna et al. |
| 2003/0035921 | A1 | 2/2003 | Kornicer et al. |
| 2003/0124305 | A1 | 7/2003 | Haataja |
| 2003/0180506 | A1 | 9/2003 | Haataja |
| 2004/0003984 | A1 | 1/2004 | Bossler |
| 2004/0063891 | A1 | 4/2004 | Colvin et al. |
| 2004/0229010 | A1 | 11/2004 | Clark et al. |
| 2005/0037202 | A1 | 2/2005 | Hejna et al. |
| 2005/0126726 | A1 | 6/2005 | Altheimer |
| 2005/0142328 | A1 | 6/2005 | Haataja |
| 2005/0171313 | A1 | 8/2005 | Colvin et al. |

FIG. 3
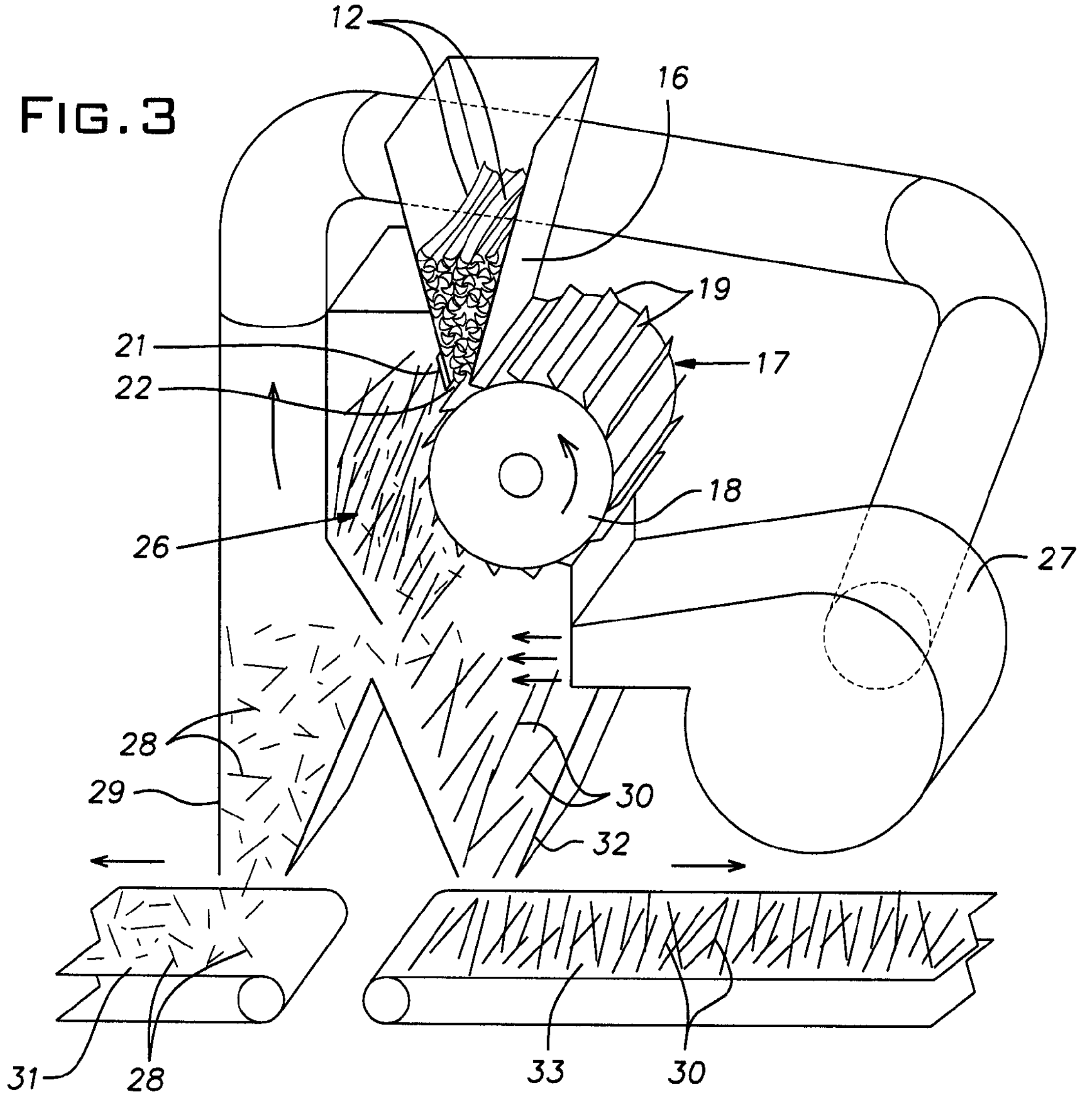
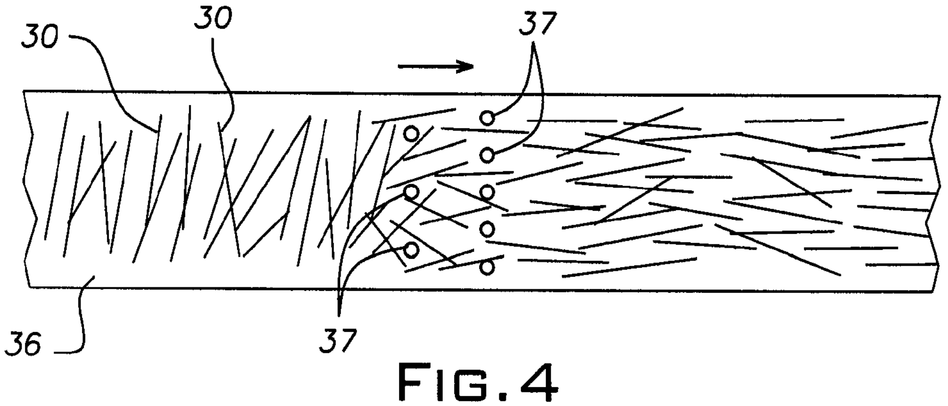
FIG. 4

CHIPBOARD

This application is a divisional of Ser. No. 12/102,050 filed Apr. 14, 2008, pending.

BACKGROUND OF THE INVENTION

The invention pertains to the manufacture of structural boards and, in particular, to a process and product utilizing a unique and plentiful source of raw material.

PRIOR ART

Oriented strand board (OSB) is a product used largely in the construction industry in place of plywood. Ordinarily, OSB sells for a price less than that of plywood. The economics are generally explained by the cost of raw material used to make these products. OSB is typically made from tree limbs sometimes called “round stock” that are too small in diameter and/or length to form lumber or plywood veneer. Supplies of round stock are limited both in volume and geography so that some price floor for this commodity necessarily exists. There remains, then, a need for a substitute material that can be at least competitive in price and availability with round wood for use in the manufacture of structural boards.

SUMMARY OF THE INVENTION

The invention provides a novel OSB construction that utilizes selected parts of oil palm tree frond cuttings as its raw material or base stock. This raw material is plentiful, low in cost, and, presently, can be a liability to growers and is largely going to waste. Frond cuttings are generated when oil palm fruit is harvested. Fronds are cut away to gain access to the fruit they naturally envelope. Currently, this harvesting is done manually, and the length of the frond cuttings is somewhat variable, but for reference purposes, may be roughly in the order of 1 to 2 meters with a woody section of a half meter with a cross-section of a frond roughly between 1/20 to 1/10 of a meter wide.

It has been discovered that a relatively high tensile strength shell part of an oil palm frond, when properly dried and separated from a low density frond core, such that it is in a strand-like form, can be processed into boards of commercial quality and strength.

The preferred strand forming process has the advantage of obtaining a relatively high yield of stranded shell material free or nearly free of the core material. As disclosed, the frond cut length or section is subjected to a planning operation in which cutting blades slice the frond length along lines that are generally parallel to the nominal length direction of the frond. This blade movement leaves the shell material in strand-like pieces that are severed away from the core. The core material is machine separated from the shell stock preferably by capitalizing on differences in density and fragment size of these two components. Typically, the cutting action is vigorous enough to knock loose large pieces of core material from the shell strands to which they may be attached that may have simultaneously sheared off with the shell material from the parent part of the frond cutting. In the disclosed board making process, the machined shell and core materials are separated from one another by impingement of an air stream directed against a flow of these mixed materials. The machine formed shell strands are thereafter generally aligned and coated with a binder and conveyed to a press. Typically, the binder is a thermoset resin. The press subjects the aligned and binder coated shell strands to heat and pressure sufficient to set the binder and produce a dense solid board.

BRIEF DESCRIPTION OF THE DRAWINGS

FIG. 3 is a diagrammatic isometric view of an exemplary system for forming strands of the shell of a frond length and separating these strands from core material originally encased within the shell;

FIG. 4 is a diagrammatic fragmentary representation of a process step in which the frond shell strands are generally oriented into a common direction;

DESCRIPTION OF THE PREFERRED EMBODIMENT

Figure 1:
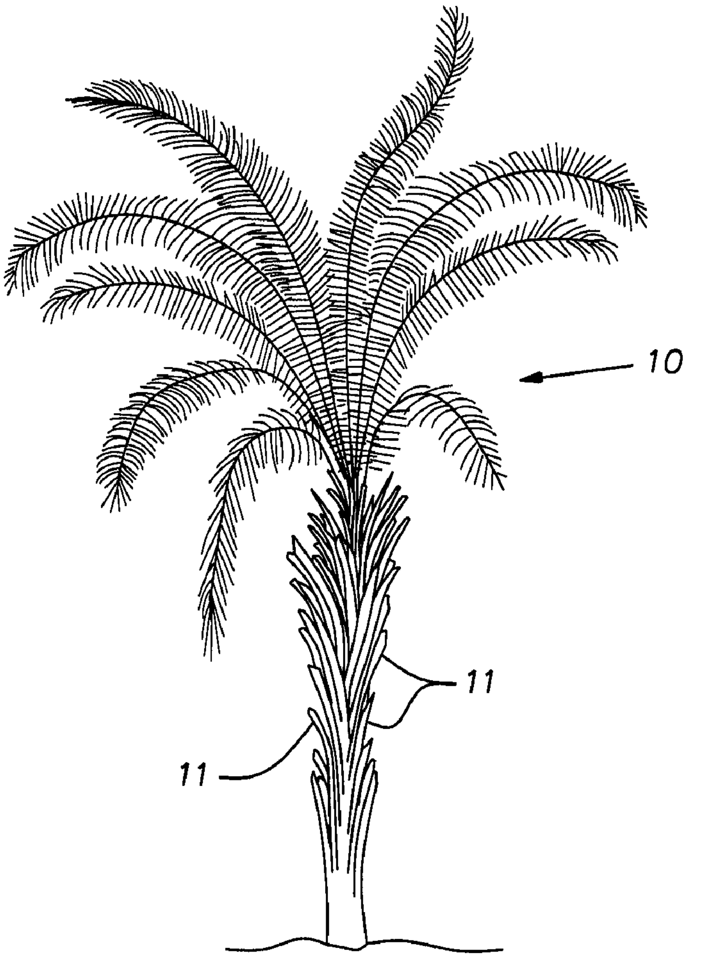
FIG. 1 is a drawing of an oil palm tree that has had lengths of its lower fronds cut away during previous harvests of its fruit.
Figure 2:
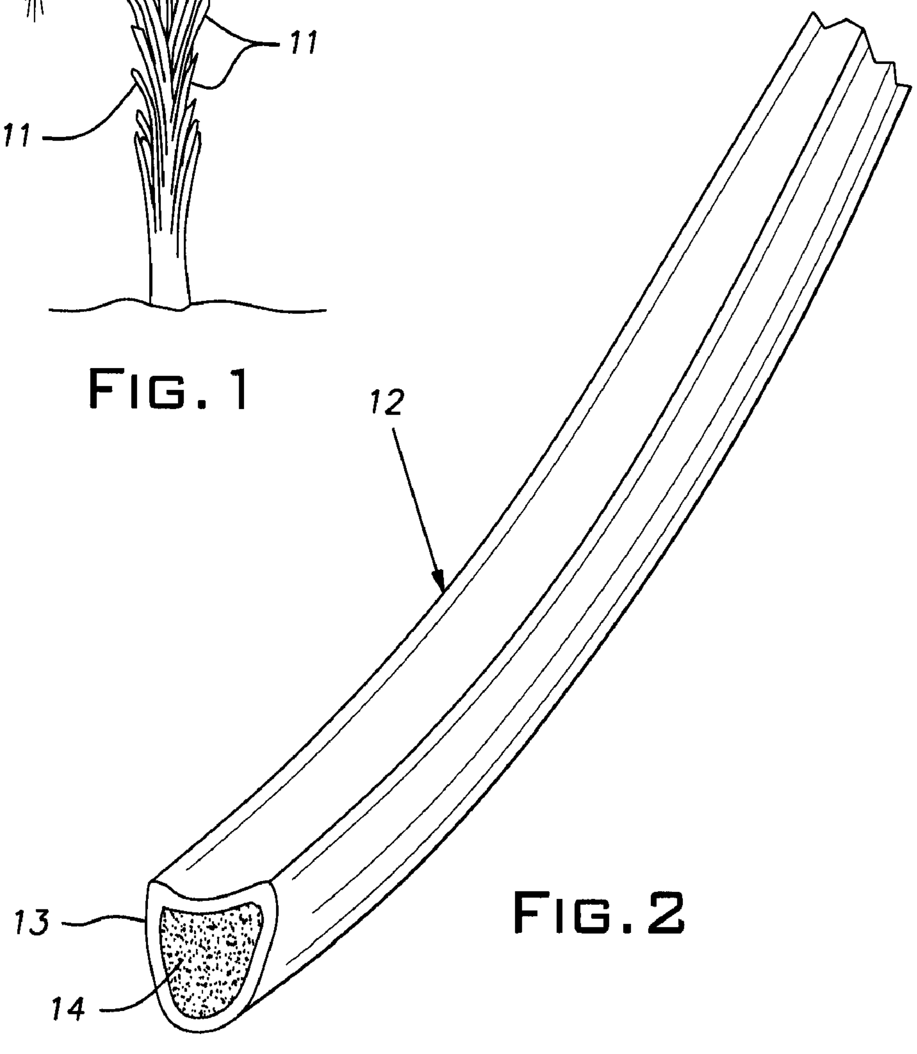
FIG. 2 is a perspective view of a length of the woody root section of a frond cut from an oil palm tree.

FIG. 1 is a drawing of an oil palm tree 10 originally indigenous to Africa and now commercially grown in various equatorial territories. The fruit of the oil palm is harvested for its oil frequently on a very large scale for food and chemical applications. To pick the fruit, a worker, typically using a machete, hacks off the fronds enveloping it from below. The truncated fronds 11, on the lower part of the tree shown in FIG. 1, are the result of this practice. A cut length 12 of a frond is illustrated in FIG. 2. On average, the frond section produced during a fruit harvest can have a woody length of about 2 or 3 feet, i.e. about ½ meter, although this length can obviously vary considerably.

The frond section or length 12 will characteristically have a modest bow or large radius of curvature and will typically be V-shaped in cross-section. Moreover, the frond length 12 has a relative hard and dense shell indicated generally at 13 associated with its exterior surfaces and a relatively soft core 14. When the frond section 12 is dry, the shell 13 is considerably harder than pine wood and the core 14 is nearly as soft as balsa wood. The volume of the core 14 substantially exceeds that of the shell 13.

In accordance with the invention, the frond section or length 12 can be processed to generate strands from the shell 13 and to separate the core material 14 from this stranded shell material.

FIG. 3 illustrates an example of a system to cut frond sections or lengths 12 into longitudinally oriented strands. Frond sections 12 are fed to a chute 16 or other device that presents the frond sections with a common orientation so that their lengths are more or less parallel, their slightly bowed character preventing full orientation.

At the lower end of the chute 16 is a rotary knife unit 17. The knife unit 17, power driven by a motor, not shown, has a cylindrical rotor 18 with a plurality of circumferentially spaced blades or knives 19 mounted in parallel alignment with the rotational axis of the rotor 18. The rotary knife unit 17 is oriented so that its axis of rotation is parallel to the preferred alignment of the frond sections 12 as determined by the lengthwise direction of the rectangular discharge area of chute 16. The blades 19 intercept and cut the frond sections 12 on lines parallel to their nominal longitudinal direction, first shearing off elongated strands of the shell 13 and, ultimately, shredding the core 14 into pieces. A gap between a restraining bar 21 at a side of the chute 16 where the blades 19 retire from the discharge area of the chute and the rise of the blades from an outer surface 22 of the rotor 18 is proportioned to assure that a frond section 12 will be cut into pieces of limited desired thickness.

The predominant lengths of strands 26 of the frond section 12 will be less than the full length of a frond section 12 owing to the natural bow of the section along its length and the straight character of the cutting edges of the blades 19. The strands 26, in general, will have aspect ratios of at least 2.

All of the material of the frond sections 12 being sheared by the rotary cutter 17 falls by gravity away from the cutting area at the bottom of the chute 16. A fan or blower 27 directs a strong air current transversely through a path of the falling shredded frond material. The velocity and volume of the air current is regulated to separate the strands designated 30 of the shell 13 from the shredded core material designated 28. This air separation works on the difference in bulk density between the relatively dense shell material 13 and relatively less dense core material 28. The core material 28 is deflected by the air stream to a chute 29 that directs it to a conveyor 31 which carries it to a collection point (not shown). The stranded shell material 30, owing to its greater density than that of the core material 28, is deflected by the air stream to a lesser extent and, consequently, falls into a chute 32 that directs it to a conveyor 33.

The stranded shell material 30, carried off by the conveyor 33 is ultimately processed into oriented strand board (OSB).

FIGS. 4 through 7 illustrate steps performed to accomplish this transformation. FIG. 4 illustrates a conveyor 36 that receives randomly oriented oil palm frond strands 30 made from the shells 13 of cut length sections 12 of fronds by a process such as described and shown in FIG. 3. The strands 30 are more or less oriented in the direction of travel of the conveyor 36 by instrumentalities such as alignment fingers or gates 37 overlying the conveyor and that require elongated strands to generally orient themselves to the conveyor direction before they can pass the fingers or gates.

Figure 5:
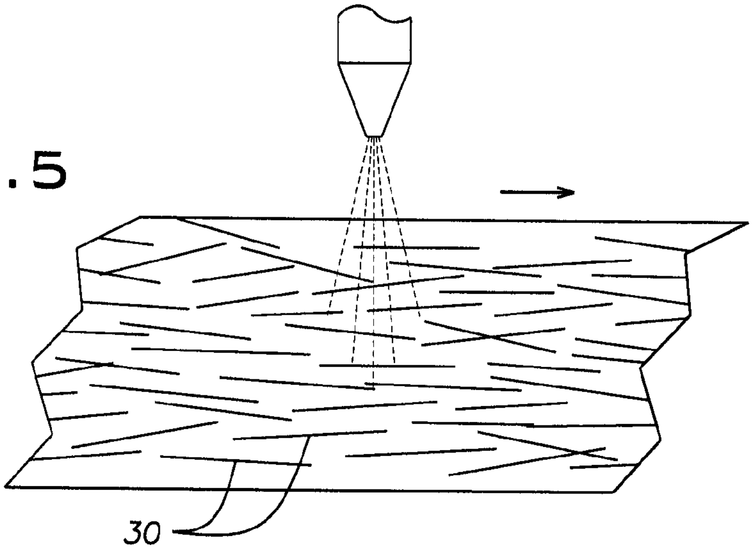
FIG. 5 is a diagrammatic fragmentary representation of a process step in which the frond shell strands are coated with a binding agent and conveyed into a multi-platen press.

After being oriented, the shell strands 30 are coated for example, by spraying, with a binder as depicted in FIG. 5. Alternatively, the binder can be in a powder or pellet form and be uniformly distributed with the strands before, while, or after the strands are oriented. The binder can be that used with common structural wood-based OSB such as a phenolic resin or an isocyanate powder. The oriented, binder coated shell strands 30 are conveyed to a press 41 such as a multi deck press known in the art where numerous platens 42 are arranged one above the other.

Figure 6A:
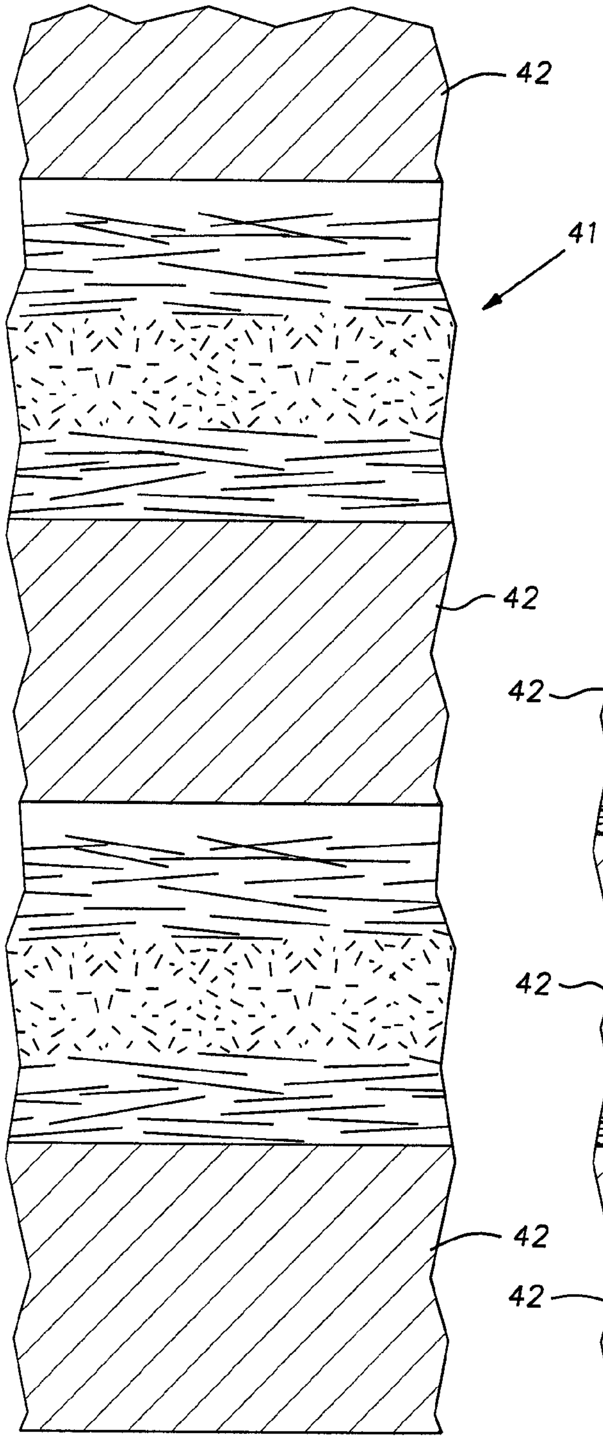
FIG. 6A is a diagrammatic representation of a charging step of a strand mat into a press.

The shell strands 30 conveyed to the press 41 are laying loosely on one another in a non-compacted state with a controlled thickness that can be received in the space between retracted platens as shown in FIG. 6A. If desired, the material forming the uncompacted mat can comprise sublayers with different orientations of the strands 26. These sublayers can be constructed upstream of the press 41. Ordinarily, the outer sublayers, i.e. the top and bottom sublayers will have an orientation of the strands 30 aligned with the ultimate panel or board's strength axis typically aligned with the longest dimension of a rectangular board. The internal sublayers can be cross-oriented to this structural direction. Moreover, the internal sublayers can contain a higher proportion of core material from the fronds 11 as compared to the outer layers where the separation of the core material from the shell strands 30 is maintained at a greater level so that these outer sublayers are comprised substantially of all stranded material from the frond shell 13.

Figure 6B:
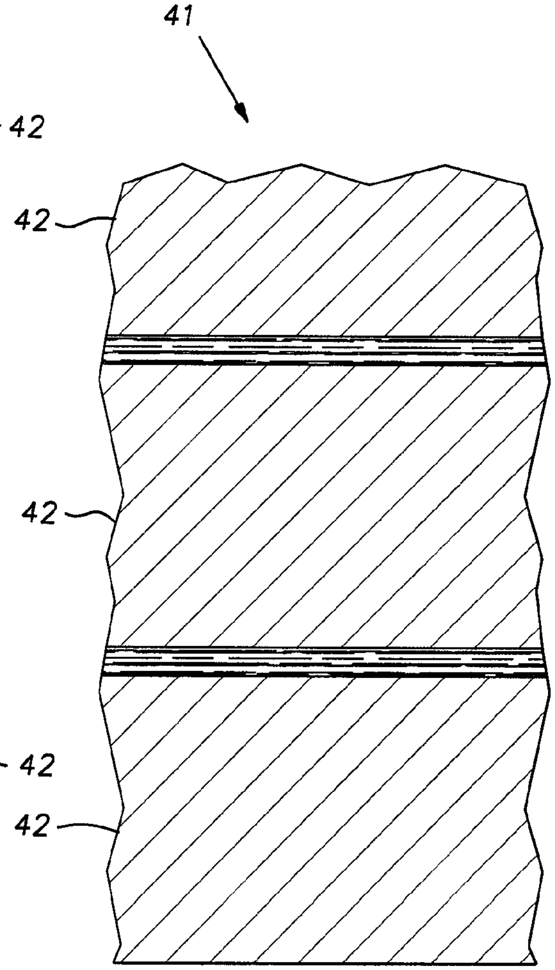
FIG. 6B is a diagrammatic representation of a pressing and heating step in the process of making OSB.

The platens 42 are internally heated to an elevated temperature sufficient to cure the binder while the shell strands 30 remain under pressure. The mats of shell strands 30, as depicted in FIG. 6B, remain under pressure and temperature for a time sufficient to cure the binder and produce a rigid structural board from the compacted, binder impregnated mat of frond strands 30. The mats and platens can be of relatively large area representing the area of several finished structural boards. Finished structural boards can be, for example, ¼" to 1" thick and 4' by 8' in planar dimensions or metric equivalents when cut from these oversize mats.

Figure 7:
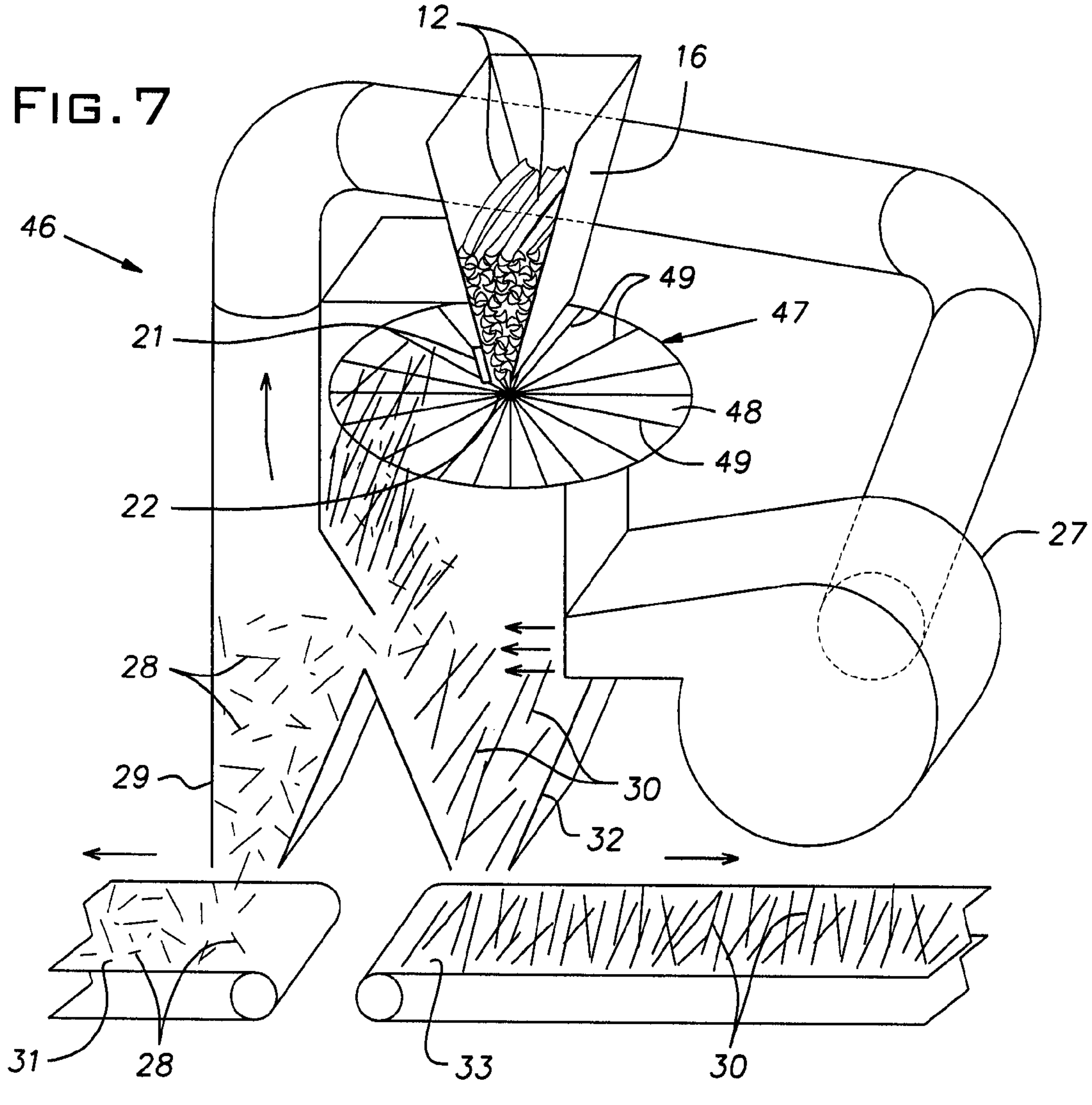
FIG. 7 is a diagrammatic representation of an alternative arrangement for a strand making apparatus with the plane of movement of the cutting blades aligned with the longitudinal direction of a frond length.

FIG. 7 illustrates an alternative device 46 and method of cutting frond sections 12 into strands oriented generally along their longitudinal direction. Elements that are the same or equivalent to those of FIG. 3 are identified with the same numerals. The device 46 comprises a circular rotor plate 47 that rotates about its central axis. On an upper face 48 of the plate 47 are mounted a plurality of bar-like knives 49. The knives 49 are oriented radially with respect to the center of rotation of the plate 47. The knives 49 pass under the chute 16 in which frond sections 12 are guided in a queue in parallel alignment. The blades or knives 49 move in a plane parallel to the nominal longitudinal axis of the general frond sections 12 and when passing across the outlet of the chute 16 cut lengthwise strands from the frond sections. The frond section strands 30, 28 of the shell and core material can be separated by an airstream in generally the same manner as described in connection with FIG. 3 or by other techniques. The strands 30, 28 of the shell of the frond sections are used as described hereinabove to produce structural panels or OSB.

It should be evident that this disclosure is by way of example and that various changes may be made by adding, modifying or eliminating details without departing from the fair scope of the teaching contained in this disclosure. For example, OSB boards can be produced in a single platen press or in a continuous processing line using a series of pressing rollers. The invention is therefore not limited to particular details of this disclosure except to the extent that the following claims are necessarily so limited.

What is claimed is:

1. An oriented strand board for structural applications comprising elongated strands having aspect ratios greater than 2, the strands being derived from the outer shells of oil palm tree frond lengths formed as a bi-product of the harvest of oil palm fruit, such that the strand length is limited to about a meter, the strands being cut from the outer shell area of the fronds and at least in the outer regions of the major faces of the board being substantially free of frond core material, the strands of the frond length shells being arranged and being permanently bonded together such that they are predominately aligned with the structural direction of the panel at least at the outer regions of the major faces of the board.

2. An oriented strand board as set forth in claim 1, wherein the board has major dimensions of about 4' by 8' and a thickness of about ¼" to 1" or metric equivalents.

3. An oriented strand board as set forth in claim 1, wherein the frond shell strands are cuttings of frond lengths produced by blades moving in directions that cut the fronds generally lengthwise.

4. An oriented strand board as set forth in claim 1, wherein the shell strands are bound together by a heat settable binder material.

* * * * *